United States Patent
Bailey

(10) Patent No.: US 8,253,357 B2
(45) Date of Patent: Aug. 28, 2012

(54) LOAD DEMAND AND POWER GENERATION BALANCING IN DIRECT SERIES ELECTRIC DRIVE SYSTEM

(75) Inventor: Bradley Bailey, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 542 days.

(21) Appl. No.: 12/210,896

(22) Filed: Sep. 15, 2008

(65) Prior Publication Data

US 2010/0066277 A1 Mar. 18, 2010

(51) Int. Cl.
*H02P 7/32* (2006.01)
(52) U.S. Cl. ........ 318/143; 318/140; 318/141; 318/142; 318/158
(58) Field of Classification Search .......... 318/140–143, 318/158

See application file for complete search history.

(56) References Cited

U.S. PATENT DOCUMENTS

| | | | |
|---|---|---|---|
| 2,279,407 A | 8/1942 | McCune | |
| 2,409,099 A | 10/1946 | Bloomfield | |
| 2,482,840 A | 9/1949 | Collins et al. | |
| 2,520,204 A | 8/1950 | Hancock | |
| 3,216,769 A | 11/1965 | Hicks et al. | |
| 3,250,973 A | 5/1966 | Dawson | |
| 3,259,216 A | 7/1966 | Klaus et al. | |
| 3,370,218 A | 2/1968 | Merz | |
| 3,410,375 A | 11/1968 | Schmidt | |
| 3,495,404 A | 2/1970 | Thompson | |
| 3,562,565 A | 2/1971 | Higashino | |
| 3,670,854 A | 6/1972 | Maci | |
| 3,696,893 A | 10/1972 | Koivunen | |
| 3,730,596 A | 5/1973 | Felix et al. | |
| 3,774,095 A | 11/1973 | Coccia | |
| 3,944,287 A | 3/1976 | Nagase | |
| 3,992,062 A | 11/1976 | Jeffrey et al. | |
| 4,012,680 A * | 3/1977 | Dickerson et al. | ............ 388/806 |
| 4,031,440 A | 6/1977 | Christian et al. | |
| 4,054,821 A | 10/1977 | Williamson | |
| 4,083,469 A | 4/1978 | Schexnayder | |
| 4,143,280 A | 3/1979 | Kuehn, Jr. et al. | |
| 4,181,366 A | 1/1980 | Dobner | |
| 4,270,806 A | 6/1981 | Venkataperumal et al. | |
| 4,280,073 A | 7/1981 | Miller | |
| 4,292,531 A | 9/1981 | Williamson | |
| 4,313,517 A | 2/1982 | Pivar | |
| 4,482,813 A | 11/1984 | Grand-Perret et al. | |
| 4,495,449 A | 1/1985 | Black et al. | |
| 4,651,071 A | 3/1987 | Imanaka | |
| 4,659,149 A | 4/1987 | Rumsey et al. | |
| 4,671,577 A | 6/1987 | Woods | |
| 4,698,561 A | 10/1987 | Buchanan et al. | |

(Continued)

*Primary Examiner* — Bentsu Ro
*Assistant Examiner* — Kawing Chan
(74) *Attorney, Agent, or Firm* — Leydig, Voit & Mayer

(57) ABSTRACT

An electric drive system includes a prime mover connected to a generator, which is controlled in part by an excitation current. The generator makes electrical power available on a dc link. A method of load demand and power generation balancing within the electric drive system includes determining a voltage of the dc link and determining a torque command by an operator of the system. A speed for each of one or more drive motors receiving power from the dc link is determined and normalized to derive an average motor speed. A mechanical power being commanded is derived based on the average motor speed and the torque command. A predicted excitation current that is required to achieve the derived mechanical power is determined and an actual excitation current is determined based on the predicted excitation current. The actual excitation current is then applied to the generator.

20 Claims, 10 Drawing Sheets

U.S. PATENT DOCUMENTS

| | | | |
|---|---|---|---|
| 4,772,829 A | 9/1988 | Pickering et al. | |
| 4,938,321 A | 7/1990 | Kelley et al. | |
| 4,962,969 A | 10/1990 | Davis | |
| 4,965,513 A | 10/1990 | Haynes et al. | |
| 5,047,699 A * | 9/1991 | Rozman et al. | 318/400.07 |
| 5,103,923 A | 4/1992 | Johnston et al. | |
| 5,139,121 A | 8/1992 | Kumura et al. | |
| 5,222,787 A | 6/1993 | Eddy et al. | |
| 5,280,223 A | 1/1994 | Grabowski et al. | |
| 5,293,966 A | 3/1994 | Chareire | |
| 5,302,008 A | 4/1994 | Miyake et al. | |
| 5,322,147 A | 6/1994 | Clemens | |
| 5,323,095 A | 6/1994 | Kumar | |
| 5,351,775 A | 10/1994 | Johnston et al. | |
| 5,355,978 A | 10/1994 | Price et al. | |
| 5,362,135 A | 11/1994 | Riddiford et al. | |
| 5,378,053 A | 1/1995 | Patient et al. | |
| 5,432,413 A | 7/1995 | Duke et al. | |
| 5,450,324 A | 9/1995 | Cikanek | |
| 5,469,943 A | 11/1995 | Hill et al. | |
| 5,472,264 A | 12/1995 | Klein et al. | |
| 5,476,310 A | 12/1995 | Ohtsu et al. | |
| 5,492,192 A | 2/1996 | Brooks et al. | |
| 5,511,859 A | 4/1996 | Kade et al. | |
| 5,523,701 A | 6/1996 | Smith et al. | |
| 5,539,641 A | 7/1996 | Littlejohn | |
| 5,551,764 A | 9/1996 | Kircher et al. | |
| 5,573,312 A | 11/1996 | Muller et al. | |
| 5,615,933 A | 4/1997 | Kidston et al. | |
| 5,632,534 A | 5/1997 | Knechtges | |
| 5,707,115 A | 1/1998 | Bodie et al. | |
| 5,754,450 A | 5/1998 | Solomon et al. | |
| 5,755,302 A | 5/1998 | Lutz et al. | |
| 5,769,509 A | 6/1998 | Feigel et al. | |
| 5,775,784 A | 7/1998 | Koga et al. | |
| 5,832,395 A | 11/1998 | Takeda et al. | |
| 5,839,800 A | 11/1998 | Koga et al. | |
| 5,853,229 A | 12/1998 | Willmann et al. | |
| 5,951,115 A | 9/1999 | Sakai et al. | |
| 5,961,190 A | 10/1999 | Brandmeier et al. | |
| 5,962,997 A | 10/1999 | Maisch | |
| 5,983,149 A | 11/1999 | Tate et al. | |
| 6,076,899 A | 6/2000 | Isella | |
| 6,078,173 A | 6/2000 | Kumar et al. | |
| 6,087,791 A | 7/2000 | Maruyama | |
| 6,097,124 A * | 8/2000 | Rao et al. | 310/156.48 |
| 6,120,115 A | 9/2000 | Manabe | |
| 6,158,822 A | 12/2000 | Shirai et al. | |
| 6,169,350 B1 * | 1/2001 | Yang | 310/216.029 |
| 6,213,567 B1 | 4/2001 | Zittlau et al. | |
| 6,226,586 B1 | 5/2001 | Luckevich et al. | |
| 6,231,134 B1 | 5/2001 | Fukasawa et al. | |
| 6,242,873 B1 | 6/2001 | Drozdz et al. | |
| 6,297,575 B1 * | 10/2001 | Yang | 310/266 |
| 6,318,487 B2 | 11/2001 | Yanase et al. | |
| 6,325,470 B1 | 12/2001 | Schneider | |
| 6,392,418 B1 | 5/2002 | Mir et al. | |
| 6,425,643 B2 | 7/2002 | Shirai et al. | |
| 6,441,573 B1 | 8/2002 | Zuber et al. | |
| 6,452,352 B1 * | 9/2002 | Farkas | 318/433 |
| 6,456,909 B1 | 9/2002 | Shimada et al. | |
| 6,457,784 B1 | 10/2002 | Böhm et al. | |
| 6,488,344 B2 | 12/2002 | Huls et al. | |
| 6,547,343 B1 | 4/2003 | Hac | |
| 6,560,515 B2 | 5/2003 | Inoue | |
| 6,663,197 B2 | 12/2003 | Joyce | |
| 6,664,653 B1 | 12/2003 | Edelman | |
| 6,687,593 B1 | 2/2004 | Crombez et al. | |
| 6,709,075 B1 | 3/2004 | Crombez et al. | |
| 6,724,165 B2 | 4/2004 | Hughes | |
| 6,771,040 B2 | 8/2004 | Kusumoto | |
| 6,815,933 B2 | 11/2004 | Taniguchi et al. | |
| 6,885,920 B2 | 4/2005 | Yakes et al. | |
| 6,910,747 B2 | 6/2005 | Tsunehara | |
| 6,933,692 B2 | 8/2005 | Gabriel et al. | |
| 6,959,971 B2 | 11/2005 | Tsunehara | |
| 6,986,727 B2 | 1/2006 | Kuras et al. | |
| 7,029,077 B2 | 4/2006 | Anwar et al. | |
| 7,059,691 B2 | 6/2006 | Tsunehara et al. | |
| 7,104,617 B2 | 9/2006 | Brown | |
| 7,136,737 B2 | 11/2006 | Ashizawa et al. | |
| 7,250,734 B1 * | 7/2007 | Iannello et al. | 318/254.1 |
| 7,290,840 B2 | 11/2007 | Tsunehara et al. | |
| 7,308,352 B2 | 12/2007 | Wang et al. | |
| 7,311,163 B2 | 12/2007 | Oliver | |
| 7,330,012 B2 | 2/2008 | Ahmad et al. | |
| 7,378,808 B2 | 5/2008 | Kuras et al. | |
| 7,385,372 B2 | 6/2008 | Ahmad et al. | |
| 7,495,411 B2 * | 2/2009 | Kaneko et al. | 318/801 |
| 7,622,877 B2 * | 11/2009 | Schulz et al. | 318/432 |
| 7,795,825 B2 * | 9/2010 | Williams | 318/156 |
| 7,872,441 B2 * | 1/2011 | Gallegos-Lopez et al. | 318/801 |
| 2001/0024062 A1 | 9/2001 | Yoshino | |
| 2002/0043962 A1 | 4/2002 | Taniguchi et al. | |
| 2002/0050739 A1 | 5/2002 | Koepff et al. | |
| 2002/0117984 A1 | 8/2002 | Zuber et al. | |
| 2003/0132039 A1 | 7/2003 | Gaffney et al. | |
| 2003/0149521 A1 | 8/2003 | Minowa et al. | |
| 2003/0151387 A1 | 8/2003 | Kumar | |
| 2003/0169002 A1 | 9/2003 | Hughes | |
| 2004/0090116 A1 | 5/2004 | Tsunehara | |
| 2004/0095789 A1 * | 5/2004 | Li et al. | 363/132 |
| 2004/0108789 A1 | 6/2004 | Marshall | |
| 2004/0239180 A1 | 12/2004 | Foust | |
| 2004/0251095 A1 | 12/2004 | Simard et al. | |
| 2005/0099146 A1 | 5/2005 | Nishikawa et al. | |
| 2005/0263329 A1 * | 12/2005 | Kuras et al. | 180/65.1 |
| 2006/0047400 A1 | 3/2006 | Prakash et al. | |
| 2006/0055240 A1 | 3/2006 | Toyota et al. | |
| 2006/0086547 A1 | 4/2006 | Shimada et al. | |
| 2006/0089777 A1 | 4/2006 | Riddiford et al. | |
| 2006/0102394 A1 | 5/2006 | Oliver | |
| 2006/0175997 A1 * | 8/2006 | Hommi et al. | 318/432 |
| 2006/0290302 A1 * | 12/2006 | Marcinkiewicz et al. | 318/66 |
| 2007/0016340 A1 | 1/2007 | Soudier et al. | |
| 2007/0145918 A1 | 6/2007 | Kumar et al. | |
| 2007/0170724 A1 * | 7/2007 | Calley | 290/44 |
| 2007/0182359 A1 | 8/2007 | Wahler | |
| 2008/0084229 A1 | 4/2008 | Frommer et al. | |

* cited by examiner

LOAD DEMAND AND POWER GENERATION BALANCING IN DIRECT SERIES ELECTRIC DRIVE SYSTEM

TECHNICAL FIELD

This patent disclosure relates generally to load demand and power generation balancing, and more particularly relates to modification of an excitation current to anticipate load demand on a drive system in direct series electric drive system.

BACKGROUND

Heavy machinery, such as off-highway trucks, are commonly used in mining, heavy construction, quarrying, and other applications. Although such machines are traditionally directly driven via an internal combustion engine, the extensive fuel consumption and mechanical complexity of such systems has spurred wide-ranging exploration of alternative power systems.

One advance that has improved efficiency associated with the use of heavy machinery is the adoption of Alternating Current (AC) or electric drive systems. Electric drive systems for machines typically include a power circuit that selectively activates one or more drive motors at a desired torque. Each of the drive motors is connected to a wheel or other traction device that operates to propel the machine. An electric drive system includes a prime mover, for example, an internal combustion engine, that drives a generator. The generator produces electrical power that is often conditioned, and ultimately used to drive the motor. The motor transforms the electrical power back into mechanical power that drives the wheel and propels the vehicle. Electric drive systems typically require less maintenance and thus, have lower life cycle costs.

However, there are other faults associated with such machines that warrant attention in order to provide optimal machine operation. For instance, the drive systems on transmission driven vehicles are inherently stable insofar as the load applied to the engine is generated directly from ground force exertion (causing acceleration). Hence, as the vehicle accelerates, the load can steadily increase. Electric drive systems, however, may include an intermediate state of loading, the electrical system, which adds a degree of freedom. This added degree of freedom disconnects the mechanical connection between the ground and the engine, thus making the system less stable. For example, the load on the generator, and thus the primary power source, can be increased in a step-wise manner instead of the more gradual manner usually experienced with engine driven machines. Such sudden increases in demanded power are not easily accommodated, and in some cases may cause the primary power source or the generator to lag or ignore the power command, or in fact, to fail. This and other shortcomings in the state of the art are addressed by aspects of the disclosed principles.

SUMMARY

The disclosure describes, in one aspect, a method of load demand and power generation balancing within the electric drive system. The electric drive system includes a prime mover connected to an electric power generator. The electric power generator is controlled, at least in part, by an excitation current. The electric power generator makes electrical power available on a DC link having voltage and current characteristics. The method of load demand and power generation balancing within the electric drive system includes determining a voltage of the DC link and determining a torque command by an operator of the system. A speed for each of one or more drive motors receiving power from the DC link is determined and normalized to derive an average motor speed. A mechanical power being commanded is derived based on the average motor speed and the torque command. A predicted excitation current that is required to achieve the derived mechanical power in a steady state mode of operation is determined, and an actual excitation current is determined based on the predicted excitation current. The actual excitation current is then applied to the generator.

In another aspect, the disclosure describes a controller for balancing the load demand and power generation within an electric drive system. The electric drive system includes a fuel-driven prime mover for driving an electrical power generator controlled at least in part by an excitation current. The electrical power generator provides electrical power available on a DC link having voltage and current characteristics. The controller includes computer-executable instructions on a computer-readable medium. The computer-executable instructions include instructions for determining a voltage of the DC link and instructions for determining a torque command by an operator of the system. Instructions for determining a speed for each of one or more drive motors receiving power from the DC link and instructions for normalizing the determined speed to derive an average motor speed are executed, followed by instructions for deriving a mechanical power that is being commanded based on the average motor speed and the torque command. Instructions for determining a predicted excitation current that is required to achieve the derived mechanical power are executed, followed by instructions for determining an actual excitation current based on the predicted excitation current. Thereafter, instructions for applying the actual excitation current to the generator are executed.

In yet another aspect, the disclosure describes a computer-readable medium having thereon computer-executable instructions for balancing the load demand and power generation within an electric drive system. The electric drive system included a fuel-driven prime mover for driving an electrical power generator controlled at least in part by an excitation current. The electrical power generator makes electrical power available on a DC link having voltage and current characteristics. The controller includes computer-executable instructions on a computer-readable medium, which include instructions for determining a voltage of the DC link and instructions for determining a torque command by an operator of the system. Instructions for determining a speed for each of one or more drive motors receiving power from the DC link and for normalizing the determined speed to derive an average motor speed are executed to derive a mechanical power that is being commanded. Instructions for determining a predicted excitation current that is required to achieve the derived mechanical power and for determining an actual excitation current based on the predicted excitation current are executed. Thereafter, instructions for applying the actual excitation current to the generator are executed to operate the generator.

DETAILED DESCRIPTION

Figure 1A:
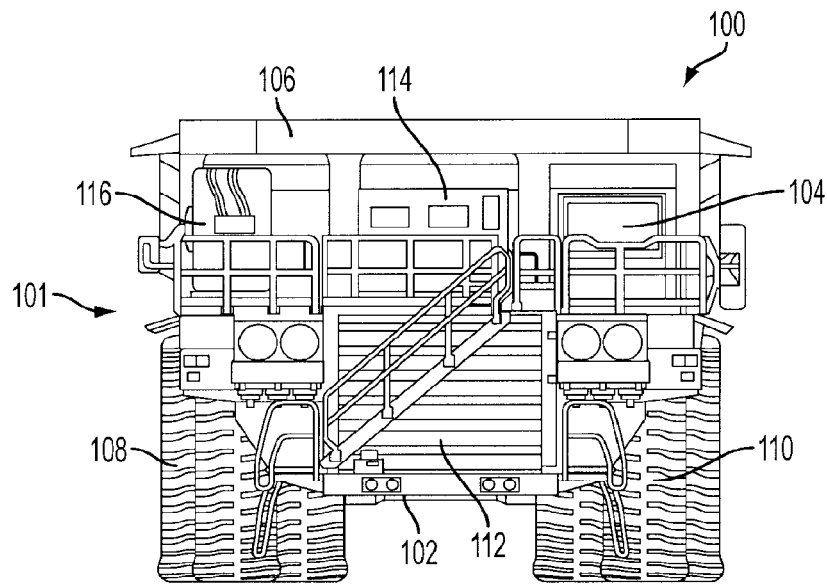
FIGS. 1A and 1B are, respectively, a front view and a side view of a machine in accordance with the disclosure.
Figure 1B:
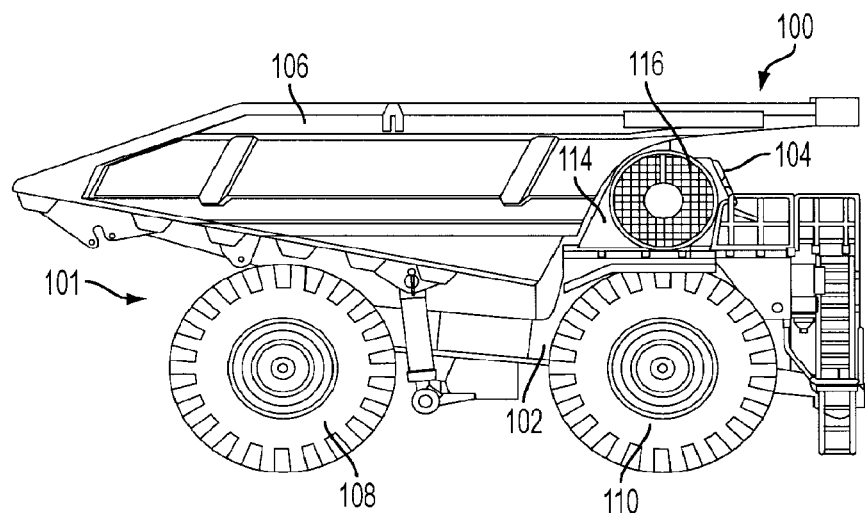

This disclosure relates to systems and methods for managing power in a direct series electric drive system, such as may be used in an off-highway truck or other heavy machine. FIG. 1A and FIG. 1B illustrate, respectively, a front and a side view of a machine 100. The machine 100 has a direct series electric drive system. One example of the machine 100 is an off-highway truck 101 such as those used for construction, mining, or quarrying. In the description that follows, this example illustrates the various arrangements that can be used on machines having direct series electric drive system systems. As can be appreciated, any other vehicle having a hybrid drive, electric-only, or direct series electric drive arrangement can benefit from the advantages described herein. The term "machine," therefore, is used to generically describe any machine having at least one drive wheel that is driven by a motor connected to the wheel. Electrical power may be generated onboard by a generator, alternator, or another power-generation device, which may be driven by an engine or other prime mover. Alternatively, electrical power may be stored but not generated on-board.

A front view of the off-highway truck 101 is shown in FIG. 1A, and a side view is shown in FIG. 1B. The off-highway truck 101 includes a chassis 102 that supports an operator cab 104 and a bucket 106. The bucket 106 is pivotally connected to the chassis 102 and is arranged to carry a payload when the off-highway truck 101 is in service. An operator occupying the operator cab 104 can control the motion and the various functions of the off-highway truck 101. The chassis 102 supports various drive system components. These drive system components are capable of driving a set of drive wheels 108 to propel the off-highway truck 101. A set of idle wheels 110 can steer such that the off-highway truck 101 can move in any direction. Even though the off-highway truck 101 includes a rigid chassis with powered wheels for motion and steerable wheels for steering, one can appreciate that other machine configurations can be used. For example, such configurations may include articulated chassis with one or more driven wheels.

Figure 2:
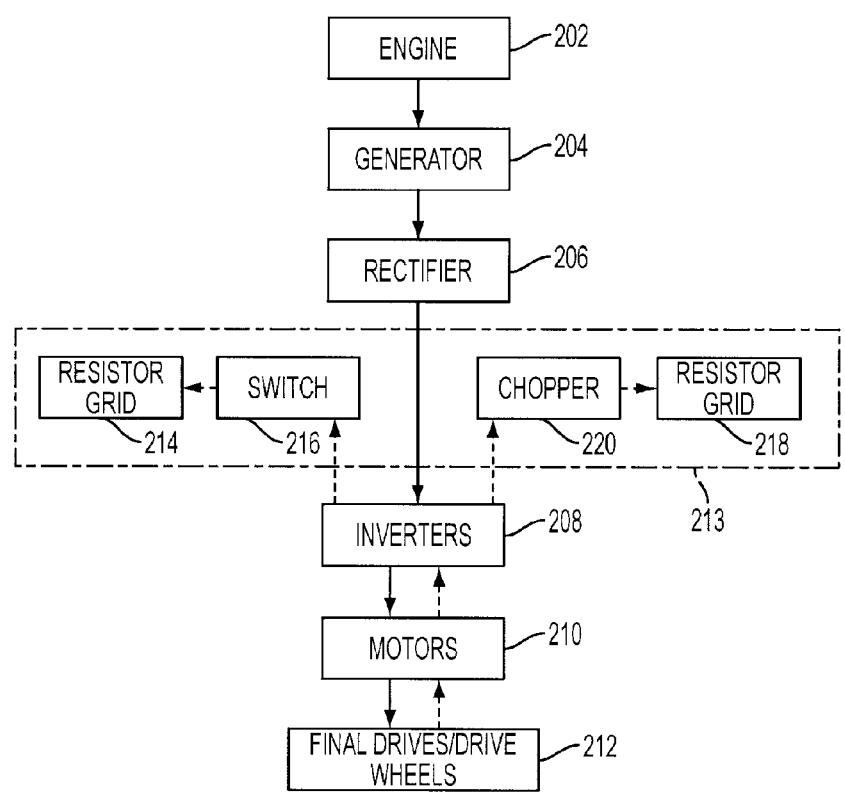
FIG. 2 is a block diagram representation of a direct series electric drive system for a machine in accordance with the disclosure.

The off-highway truck 101 has a direct series electric drive system, which in this instance refers to the use of more than one source or form of power to drive the drive wheels 108. A block diagram for the direct series electric drive system of the machine 100, for example, the off-highway truck 101, is shown in FIG. 2. In the block diagram, the flow direction of power in the system when the machine is propelled is denoted by solid-lined arrows. Conversely, the flow of power during a retarding mode is shown in dash-lined arrows. The direct series electric drive system includes an engine 202, for example, an internal combustion engine such as a diesel engine, which produces an output torque at an output shaft (not shown). The output shaft of the engine 202 is connected to a generator 204. In operation, the output shaft of the engine 202 rotates a rotor of the generator 204 to produce electrical power, for example, in the form of alternating current (AC) power. This electrical power is supplied to a rectifier 206 and converted to direct current (DC) power. The rectified DC power may be converted again to an AC power by an inverter circuit 208. The inverter circuit 208 may be capable of selectively adjusting the frequency and/or pulse-width of its output, such that motors 210 that are connected to an output of the inverter circuit 208 may be operated at variable speeds. The motors 210 may be connected via final assemblies (not shown) or directly to drive wheels 212 of the machine 100.

When the off-highway truck 101 is propelled, the engine 202 generates mechanical power that is transformed into electrical power, which is conditioned by various electrical components. In an illustrated embodiment, such components are housed within a cabinet 114 (FIG. 1A). The cabinet 114 is disposed on a platform that is adjacent to the operator cab 104 and may include the rectifier 206 (FIG. 2), inverter circuit 208 (FIG. 2), and/or other components. When the off-highway truck 101 is to be decelerated or its motion is otherwise to be retarded, for example, to prevent acceleration of the machine when travelling down an incline, its kinetic energy is converted to electrical energy. Effective disposition of this generated electrical power enables effective retarding of the off-highway truck 101.

Specifically, when the machine 100 is retarding, the kinetic energy of the machine 100 is transferred into rotational power of the drive wheels that rotates the motors 210, which act as electrical generators. The electrical power generated by the motors 210 has an AC waveform. Because the inverter circuit 208 is a bridge inverter, power supplied by the motors 210 is rectified by the inverter circuit 208 into DC power. Dissipation of the DC power generated by the motors 210 produces a counter-rotational torque at the drive wheels 108 to decelerate the machine. Dissipation of this DC power may be accomplished by passing the generated current rectified by the inverter circuit 208 through a resistance. To accomplish this, a retarder arrangement 213 may include a first resistor grid 214, described in greater detail below, that is arranged to receive current from the inverter circuit 208 via a switch 216. When the switch 216 is closed, the electrical power corresponding to the current generated by the motors 210 may pass through the first resistor grid 214 and dissipate as heat. Additionally, excess electrical power is also dissipated as heat as it passes through a second resistor grid 218, which is arranged to receive electrical power via a chopper circuit 220. The chopper circuit 220 operates to selectively route a portion of the developed electrical power through the second resistor grid 218. One embodiment for the drive and retard system is described in more detail below.

Figure 3:
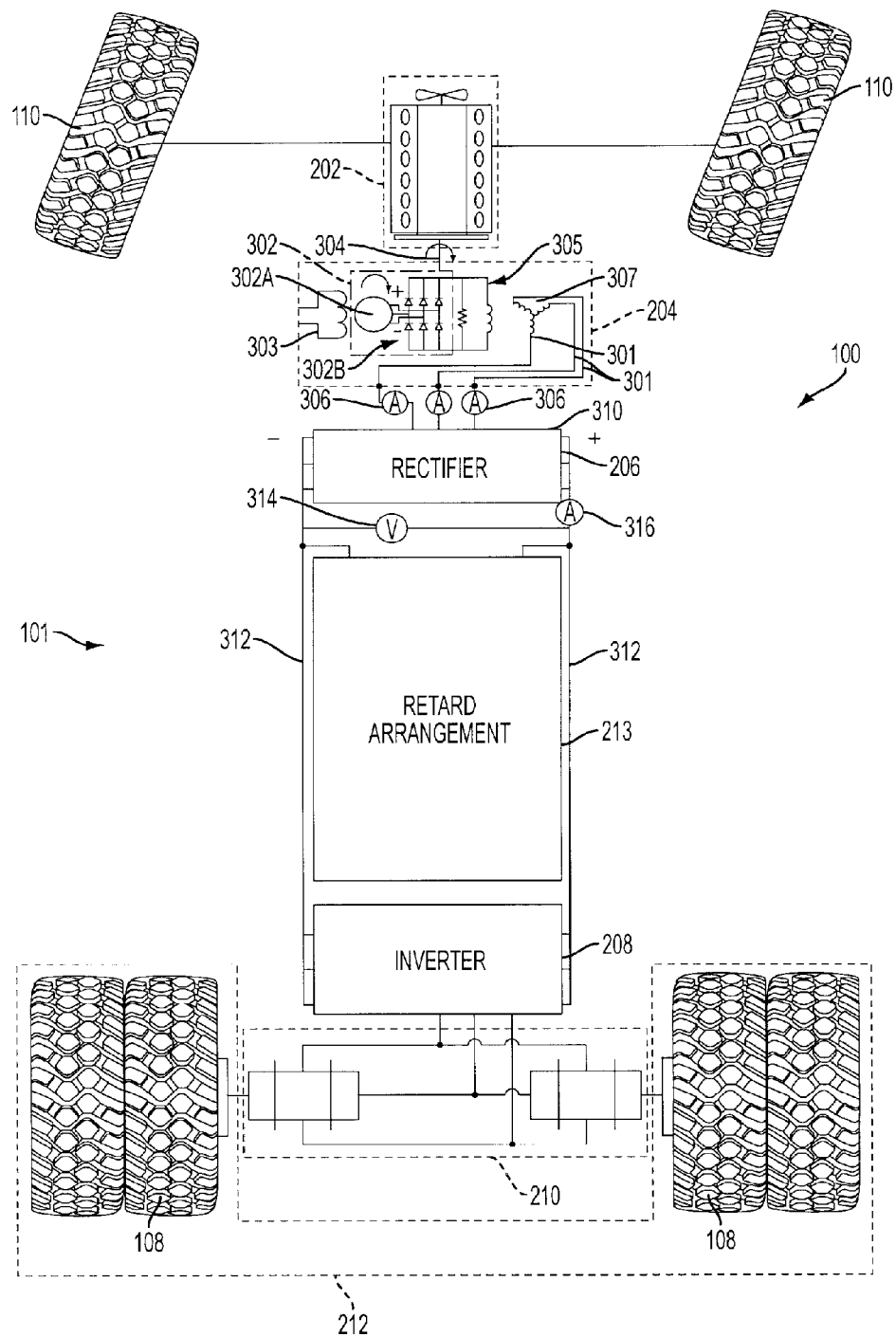
FIG. 3 is another block diagram representation of a drive system in which the disclosed principles may be deployed.
Figure 4:
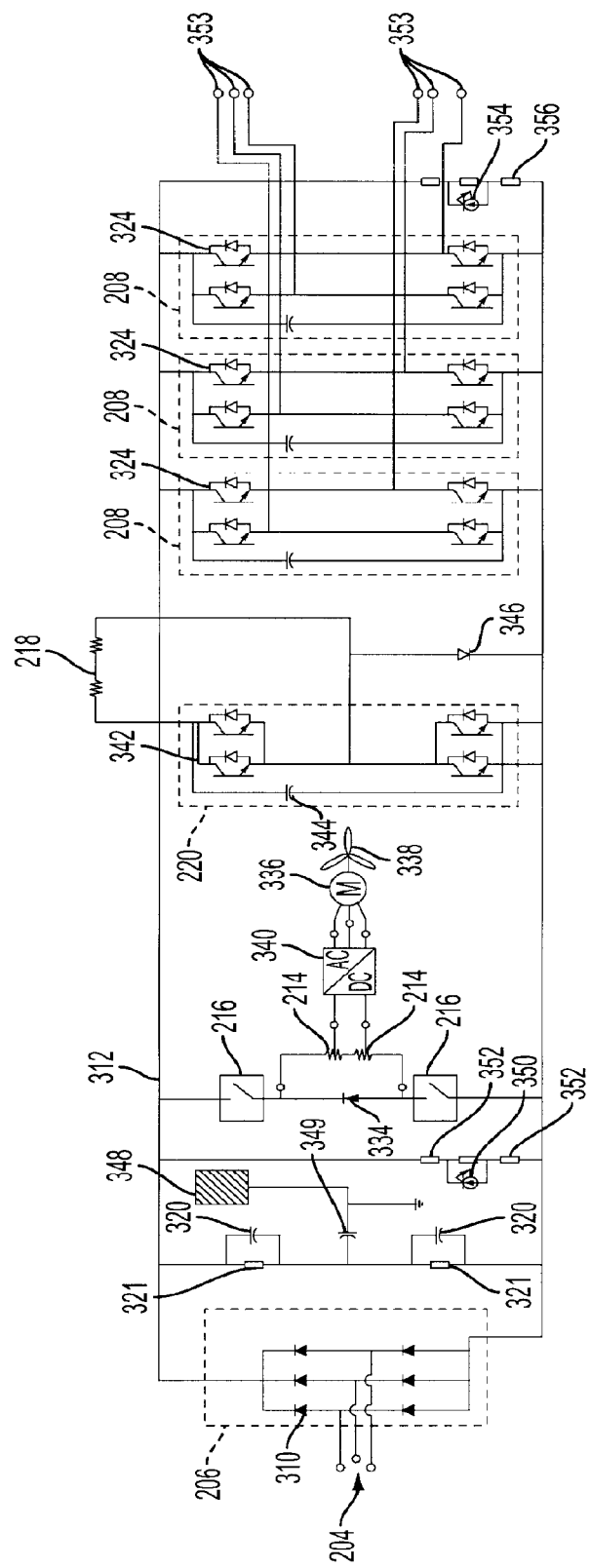
FIG. 4 is a simplified electrical circuit diagram for the power circuit used in the drive and retard system shown in FIG. 3.

A block diagram of the direct series electric drive system of the off-highway truck 101, as one example for the machine 100, is shown in FIG. 3 and FIG. 4. In these views, elements that were previously described are denoted by the same reference numerals for the sake of simplicity. Further, the block diagram of FIG. 4 includes a particular embodiment with component examples that can be included in the functional blocks shown in FIG. 3. Hence, the block diagrams shown in FIG. 3 and FIG. 4 should be referred to together when considering the description that follows. As shown, the engine 202 is connected to the generator 204 (shown in FIG. 3) via an output drive shaft 304. Even though a direct connection to the output drive shaft 304 is shown, other drive components, such as a transmission or other gear arrangements, may be utilized to couple the output of the engine 202 to the generator 204. The generator 204 may be any appropriate type of generator or alternator known in the power generation art.

In one embodiment, the generator 204 is a three-phase alternating current (AC) synchronous generator having a brushless, wound rotor. The generator 204 has an output 301 for each of three phases of alternating current being generated, with each output having a respective current transducer 306 connected thereto. The rotor of the generator 204 (shown in FIG. 3) includes a rotating rectifier 302 that is connected to a rotating exciter armature 302A. The rotating exciter armature 302A is energized by an excitation field produced by an excitation winding 303. Thus, the application of an excitation signal at the input to the excitation winding 303 creates an excitation field to activate the generator field 305. The generator field 305, in turn, produces the output available at three leads of the armature 307 of the generator 204.

In the illustrated embodiment, the rotating rectifier 302 includes a rotating exciter armature 302A that is connected to an array of rotating diodes 302B. The three current outputs of the generator 204, which are collectively considered the output of the generator 204, are connected to a rectifier 206. If one of the array of rotating diodes 302B fails, a greater current is required to develop a given voltage. Thus, the direct series electric drive system tends to operate less efficiently when such a malfunction occurs.

The rectifier 206 converts the AC power supplied by the generator 204 into DC power. Any type of rectifier 206 may be used. In the example shown, the rectifier 206 includes six power diodes 310 (best shown in FIG. 4) that are arranged in diode pairs around each phase of the output of the generator 204. Each diode pair includes two power diodes 310 that are connected in series to each other, with a connection to each phased output of the generator 204 between each pair. The three pairs of power diodes 310 are connected in parallel to each other and operate to develop a voltage across a DC linkage or DC link 312. This DC link voltage is available at a first rail and a second rail of the DC link 312. The first rail is typically at a first voltage and the second rail is typically at a second voltage during operation. Either of the first and second voltages may be zero.

During operation, a voltage is developed across the first and second rails of the DC link 312 by the rectifier 206 and/or an inverter circuit 208. One or more capacitors 320 may be connected in parallel with one or more resistors 321 across the DC link 312 to smooth the voltage V across the first and second rails of the DC link 312. The DC link 312 exhibits a DC link voltage, V, which can be measured by a voltage transducer 314, and a current, A, which can be measured by a current transducer 316, as shown in FIG. 3.

The inverter circuit 208 is connected in parallel with the rectifier 206 and operates to transform the DC voltage V into variable frequency sinusoidal or non-sinusoidal AC power that drives, in this example, two drive motors 210 (FIG. 3). Any known inverter may be used for the arrangement of the inverter circuit 208. In the example shown in FIG. 4, the inverter circuit 208 includes three phase arrays of insulated-gate bipolar transistors (IGBT) 324 that are arranged in transistor pairs and that are configured to supply a 3-phase AC output to each drive motor 210.

The inverter circuit 208 can control the speed of the motors 210 by controlling the frequency and/or the pulse-width of the AC output. The drive motors 210 may be directly connected to the drive wheels 108 or may power the final drives that power the drive wheels 212. Final drives, as is known, operate to reduce the rate of rotation and increase the torque between each drive motor 210 and each set of drive wheels 212.

In alternative embodiments, the engine 202 and generator 204 are not required to supply the power necessary to drive the drive motors 210. Instead, such alternative embodiments use another source of power, such as a battery or contact with an electrified rail or cable. In some embodiments, one drive motor 210 may be used to power all drive wheels of the machine, while in other embodiments, any number of drive motors may be used to power any number of drive wheels, including all wheels connected to the machine.

Returning now to the block diagrams of FIG. 3 and FIG. 4, when the machine 100 operates in an electric braking mode, which is also known as electric retarding, less power is supplied from the generator 204 to the DC link 312. Because the machine is travelling at some non-zero speed, rotation of the drive wheels 108 due to the kinetic energy of the machine 100 will power the drive motors 210. The drive motors 210, in this mode, act as generators by producing AC electrical power. Consumption or disposition of this electrical power will consume work and act to apply a counter-rotational torque on the drive wheels 108, causing them to reduce their rotational speed, thus retarding the machine.

The generated AC electrical power can be converted into DC electrical power through the inverter circuit 208 for eventual consumption or disposition, for example, in the form of heat. In an illustrated embodiment, a retarder arrangement 213 consumes such electrical power generated during retarding. The retarder arrangement 213 can include any suitable arrangement that will operate to dissipate electrical power during retarding of the machine. In the exemplary embodiments shown in FIG. 4, the retarder arrangement 213 includes a first resistor grid 214 that is arranged to dissipate electrical energy at a fixed rate. The retarder arrangement 213 also includes a second resistor grid 218, to which DC current is supplied at a selectively variable rate by use of a pulse width modulator (PWM) or chopper circuit 220. In this way, the second resistor grid 218 dissipates electrical energy at a variable rate.

When the machine 100 is to operate in a retarding mode, the first resistor grid 214 is connected between the first and second rails of the DC link 312 so that current may be passed therethrough. When the machine 100 is being propelled, however, the first resistor grid 214 is electrically isolated from the DC link 312 by two contactors or bipolar automatic switches (BAS) 216. Each BAS 216 may include a pair of electrical contacts that are closed by an actuating mechanism, for example, a solenoid (not shown) or a coil creating a magnetic force that attracts the electric contacts to a closed position. The BAS 216 may include appropriate electrical shielding and anti-spark features that can allow these items to operate repeatedly in a high voltage environment.

When the machine 100 initiates retarding, it is desirable to close both BAS 216 within a relatively short period such that the first resistor grid 214 is placed in circuit between the first and second DC rails to begin energy dissipation rapidly. Simultaneous actuation or actuation at about the same time, such as, within a few milliseconds, of the pair of BAS 216 may also advantageously avoid charging the first resistor grid 214 and other circuit elements to the voltage present at the rails of the DC link 312. The pair of BAS 216 also prevents exposure of each of the BAS 216 or other components in the system to a large voltage difference (the voltage difference across the DC link 312) for a prolonged period. A diode 334 may be disposed in parallel to the first resistor grid 214 to reduce arcing across the BAS 216, which also electrically isolates the first resistor grid 214 from the DC link 312 during a propel mode of operation.

When the machine 100 is retarding, a large amount of heat can be produced by the first resistor grid 214. Such energy, when converted to heat, must be removed from the first resistor grid 214 to avoid an overheating condition. For this reason, a blower 338, driven by a motor 336, operates to convectively cool the first resistor grid 214. There are a number of different alternatives available for generating the power to drive the motor 336. In this embodiment, a DC/AC inverter 340 is arranged to draw power from voltage-regulated locations across a portion of the first resistor grid 214. The DC/AC inverter 340 may advantageously convert DC power from the DC link 312 to 3-phase AC power that drives the motor 336 when voltage is applied to the first resistor grid 214 during retarding.

In the illustrated embodiment, the BAS 216 are not arranged modulate the amount of energy that is dissipated through the first resistor grid 214. During retarding, however, the machine 100 may have different energy dissipation requirements. This is because, among other things, the voltage V in the DC link 312 should be controlled to be within a predetermined range. To meet such dissipation requirements, the second resistor grid 218 can be exposed to a controlled current during retarding through action of the chopper circuit 220. The chopper circuit 220 may have any appropriate configuration that will allow modulation of the current supplied to the second resistor grid 218. In this embodiment, the chopper circuit 220 includes an arrangement of transistors 342 that can, when actuated according to a desired frequency and/or duration, modulate the current passed to the second resistor grid 218. This controls the amount of energy dissipated by the second resistor grid 218 during retarding. The chopper circuit 220 may additionally include a capacitor 344 that is disposed between the first and second rails of the DC link 312 and that regulates the voltage input to the chopper circuit 220. A switched diode 346 may be connected between the second resistor grid 218 and the DC link 312 to protect against short circuit conditions in the DC link 312 and to provide a device that can deactivate the DC link 312, for example, during service.

The passage of current through the second resistor grid 218 will also generate heat, necessitating cooling of the second resistor grid 218. In this embodiment, the first and second resistor grids 214 and 218 may both be located within the blower housing 116 (also shown in FIG. 1A and FIG. 2) for convective cooling when the motor 336 and blower 338 are active.

The embodiment for a drive system shown in FIG. 4 includes other components that are discussed for the sake of completeness. Such components are optional but are shown herein because they promote smooth and efficient operation of the drive system. In this exemplary embodiment, a leakage detector 348 is connected between the two resistors 321, in series with a capacitor 349, to the first and second rails of the DC link 312. The leakage detector 348 detects any current leakage to ground from either of the first and second rails of the DC link 312. Further, in one embodiment, a first voltage indicator 350 may be connected between resistors 352 across the first and second rails of the DC link 312. The first voltage indicator 350 may be disposed between the rectifier 206 and the retarder arrangement 213 such that a high voltage condition may be detected. In a similar fashion, a second voltage indicator 354 may be connected between resistors 356 across the first and second rails of the DC link 312. The second voltage indicator 354 may be disposed between connection nodes 353 that connect to the drive motors 210 and the inverter circuit 208 to detect a voltage condition occurring during, for example, a bus bar fracture where the DC link 312 is not continuous, in order to diagnose whether the inverter circuit 208 is operating.

Figure 5:
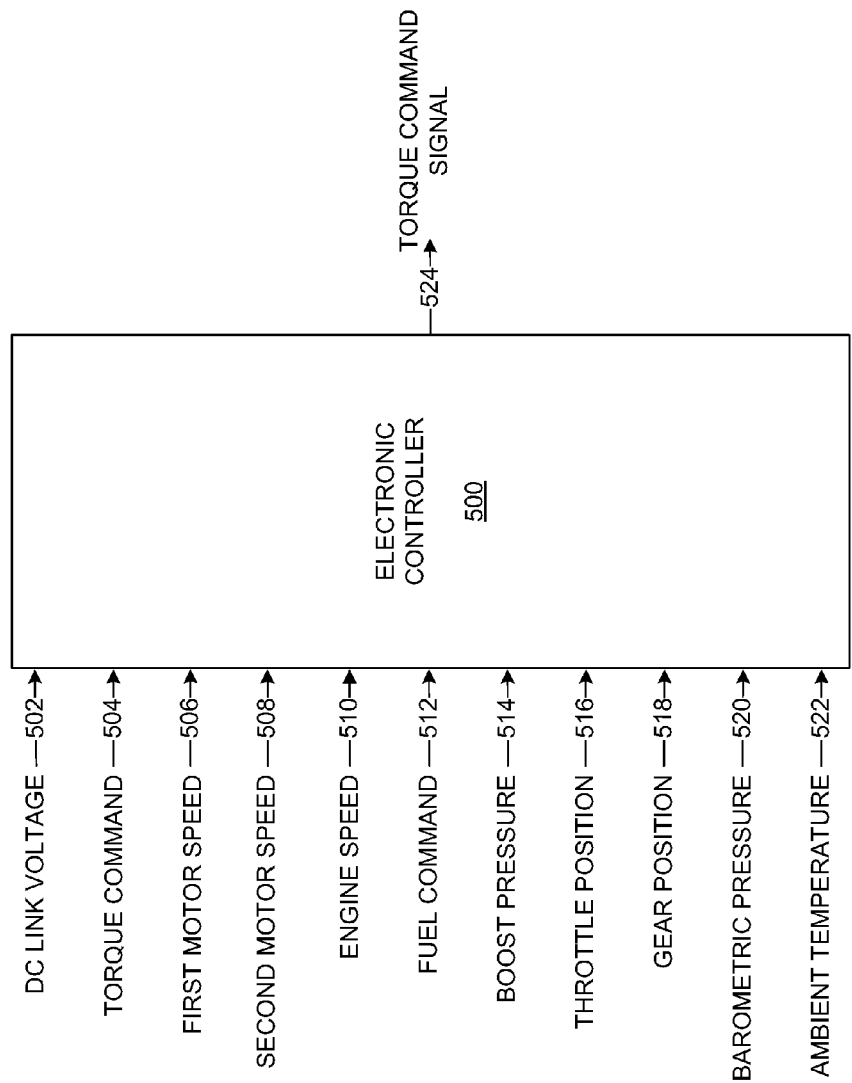
FIG. 5 is a block diagram illustrating various connections between a controller and various components of an electric drive system in accordance with the disclosure.

A block diagram for an electronic controller for use in the drive system of an electric drive machine is shown in FIG. 5. The electronic controller may be a single controller or may include more than one controller disposed to control various functions and/or features of a machine. For example, a master controller, used to control the overall operation and function of the machine, may be cooperatively implemented with a motor or engine controller, used to control the engine 202. In this embodiment, the term "controller" is meant to include one, two, or more controllers that may be associated with the machine 100 and that may cooperate in controlling various functions and operations of the machine 100 (FIG. 1). The functionality of the controller, while shown conceptually in FIG. 5 to include various discrete functions for illustrative purposes only, may be implemented in hardware and/or software without regard to the discrete functionality shown. Accordingly, various interfaces of the controller are described relative to components of the drive system shown in the block diagram of FIG. 3. Such interfaces are not intended to limit the type and number of components that are connected, nor the number of controllers that are described.

It will be appreciated that the controllers discussed herein are or comprise a computing device, e.g., a processor, which reads computer-executable instructions from a computer-readable medium and executes those instructions. Media that are readable by a computer include both tangible and intangible media. Examples of the former include magnetic discs, optical discs, flash memory, RAM, ROM, tapes, cards, etc. Examples of the latter include acoustic signals, electrical signals, AM and FM waves, etc. As used in the appended claims, the term "computer-readable medium" denotes only tangible media that are readable by a computer unless otherwise specifically noted in the claim.

In FIG. 5, a controller 500, which can be an electronic controller, is disposed to receive a voltage signal provided at a node 502, which voltage signal is indicative of the instantaneous DC voltage present at the DC link 312 (FIG. 3). The voltage transducer 314, for example, measures this value. In a similar fashion, the controller 500 receives a torque command signal provided at a second node 504, which is indicative of the torque being commanded by an operator of the machine. The torque command signal may be generated directly or indirectly by an accelerator pedal or lever that is displaced by the operator. In an alternate embodiment, the torque command signal may be generated by the same or another controller of the machine, e.g., a speed governor.

In one embodiment, the machine 100 (FIG. 1A) may include sensors that measure the rotational speed of each of the drive motors. For example, the motors 210 (FIG. 3) may each have a speed sensor (not shown) integrated or otherwise associated therewith. Each speed sensor may be arranged to measure a rotational speed of each motor 210 and make such information available to the electronic controller 500 via appropriate connections there between. Hence, the electronic controller 500 receives first and second motor speed signals at a third and fourth nodes 506 and 508, respectively. In one embodiment, the first and second motor speed signals are indicative of the rotational speed of each of two electric drive motors of the machine. In an alternative embodiment having fewer or more than two drive motors, the electronic controller may be arranged to receive a respective drive motor speed signal for each drive motor of the system.

The electronic controller 500 further receives signals indicative of operating parameters of the engine. For example, the electronic controller receives an engine speed (RPM) at a fifth node 510, which is indicative of the rotational speed of the engine. The electronic controller 500 may receive other information from the engine or a separate controller (not shown) that is connected to the engine. Such other engine parameters can include an actual fuel command to the injectors of the engine at a sixth node 512, a boost pressure or air pressure in the intake manifold of the engine at a seventh node 514, and other parameters.

The electronic controller 500 may also receive signals indicative of other parameters that relate to the operation of other machine systems or to the operating environment of the machine. Such signals include a throttle position at an eighth node 516. The throttle position signal may be a signal indicative of the position as well as the rate of change of position of a control of the operator that is used to set the acceleration state of the machine. A gear position at a ninth node 518 carries a signal that is indicative of the state of a gear system of the machine. Such a gear system may be employed, for example, to set a travel direction of the machine, to adjust the torque between one or more drive motors of the machine and the wheels, to operate a motor connected to an implement of the machine, and so forth. Lastly, the electronic controller 500 may receive other inputs that are indicative of the operating environment of the machine, such as a barometric pressure at tenth node 520, an ambient temperature at an eleventh node 522, and others.

The electronic controller 500 is connected to and operates to control the operation of various components and systems of the machine. In one embodiment, the electronic controller 500 is connected to the inverter circuit 208 that operates the drive motors 210 (FIG. 3). The electronic controller 500 is arranged to control the torque of the motors 210 during operation, by sending an appropriate torque command signal to the inverter circuit 208 via first output node 524. The torque command signal may be appropriately limited and modified to represent the maximum permissible torque that the direct series electric drive system can deliver under any given steady state or transient operating circumstances. The methods of limiting and modifying the torque command signal by the electronic controller 500 are described below.

The electronic controller 500 is capable of executing control algorithms that produce torque command signals, which are inclusive of operator commands and which are capable of limiting the torque commanded by the operator based on physical limitations of the direct series electric drive system that are attributed to the generator and the engine. From a broad perspective, the electronic controller 500 can consider the operating state of the generator in terms of predicting the state of the magnetic fields when changes in the operation of the machine are commanded, as well as being capable of reacting to changes in a manner that maintains stability in the system. At the same time, the electronic controller may also be capable of predicting the rate of change of delivery of power by the engine when the engine is undergoing transient state changes, as well as being able to cope or react to operating conditions that would tend to place the engine in an underspeed condition, for example, when load increases occur suddenly in the drive system as would occur when a fully loaded machine begins ascending a steep incline from a dead stop.

To address such conditions, concurrent changes to the power of the generator by adjustment of the excitation signal are required. If such conditions are not effectively addressed, a mismatch in the power supply and consumption of the drive system may occur, which can lead to either a drop in the voltage of the DC link or to a dramatic increase in the current of the DC link during operation. Moreover, various changes during operation may require intervention by the electronic controller to adjust the torque commanded to the drive motors. For instance, when the machine encounters a shallow uphill grade during motion, the voltage in the DC link may drop. The increase in power and reduction in voltage in the DC link may cause an increase in the current passing through the DC link and a drop in engine speed due to the power increase, both of which changes will require a relatively rapid change in the output current in the generator. In one embodiment, these issues are addressed by adjustments made to the torque commanded to the motors. These and other capabilities of the electronic controller are presented from a broad perspective in the block diagram of FIG. 6.

The various input signals are used by the electronic controller 500 to refine and optimize the performance of the machine. In one embodiment, the electronic controller is capable of adjusting the torque being commanded to the drive motors of the machine. One such adjustment may be to limit the torque commanded to the motors relative to the torque requested by the operator. The limiting of the torque commanded may be performed to avoid exceeding transient capability limits of the engine and alternator, avoid inefficiencies in the operation of the generator, and potentially improve transient performance and fuel efficiency of the machine. Another adjustment may be to modify the torque commanded to the motors based on a percentage of energy utilization of the machine. The modification of torque commands may operate to increase or decrease the torque being commanded and the operating state of the engine and the generator of the machine such that a mode of operation is achieved that balances the load consumed by the drive system of the machine with the load input to the drive system by the engine and/or the generator. These and other functions of the electronic controller 500 are described below relative to exemplary embodiments.

Figure 6:
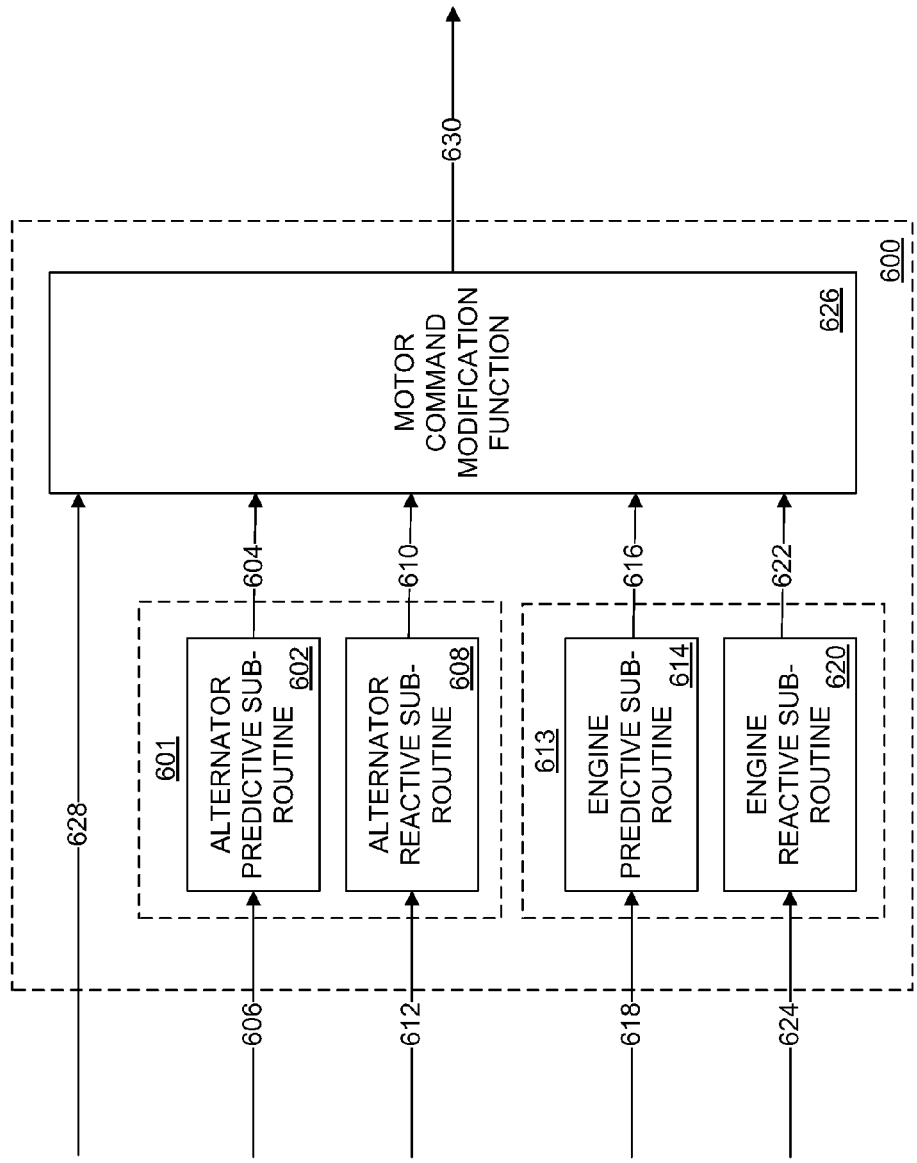
FIG. 6 is a block diagram illustrating various computer-executable modules within an electronic controller in accordance with the disclosure.

FIG. 6 represents one embodiment for an electronic controller 600. FIG. 6 is a block diagram of various functional algorithms that are included in the electronic controller 600. The electronic controller 600 includes subroutines that can impose torque command limits to a torque command signal requested by an operator of the machine. These subroutines are functionally segregated by their function into subroutines that address generator-based limits and engine-based limits. More specifically, an alternator predictive subroutine 602 belonging to an alternator limit-based portion 601 of the electronic controller 600 may yield a first torque limit 604 that is based on the predicted performance of the generator based on operating conditions. Such operating conditions may include the speed of the engine, the excitation current, the voltage of the DC link, the torque command by the operator, the speed of the drive motors, and others, which are input to the alternator predictive subroutine 602 via a first input node 606.

An alternator reactive subroutine 608, which also functionally belongs to the alternator limit-based portion 601 of the electronic controller 600, may yield a second torque limit 610 that represents a reactive adjustment that is performed when the operating conditions of the generator dynamically change during operation of the machine. Such adjustment may be performed by use of a closed loop controller, such as a proportional/integral (PI) term controller, or a model based controller that adjusts the torque limit for the torque commanded to the electric drive motors based on the magnitude of a change in one of the input parameters to the alternator reactive subroutine 608. This adjustment is performed based on monitoring of various machine parameters, which may include the speed of the engine, a desired or target value for the voltage in the DC link, the actual voltage in the DC link, the torque command by the operator, the speed of the drive motors, and others. These input parameters are input to the alternator reactive subroutine 608 via a second input node 612.

The electronic controller 600 also has an engine limit-based portion 613 that includes an engine predictive subroutine 614. The engine predictive subroutine 614 yields a third torque limit 616 that is based on the predicted transient performance of the engine based on operating conditions. Such operating conditions may include a desired value or target for the speed of the engine, an actual value representing the speed of the engine, a torque command by the operator, and the speed of the drive motors, among others. Such operating conditions may be input to the engine predictive subroutine via a third input node 618.

An engine reactive subroutine 620, which also functionally belongs to the engine limit-based portion 613 of the electronic controller 600, may yield a fourth torque limit 622 that represents a reactive adjustment to the torque commanded, which is performed when the operating conditions of the engine dynamically change during operation of the machine. Such adjustment may be performed by use of a closed loop controller, such as a proportional/integral (PI) term controller, or a model based controller that adjusts the torque limit for the torque commanded to the electric drive motors based on the magnitude of a change in one of the input parameters to the engine reactive subroutine 620. This adjustment is performed based on monitoring of various machine parameters, which may include the desired speed of the engine, the actual speed of the engine, an engine load signal that is indicative of the percent (%) load on the engine, the torque command by the operator, the speed of the drive motors, and others. These input parameters are input to the engine reactive subroutine 620 via a fourth input node 624.

The various subroutines described thus far continuously monitor the operation of their respective components or systems, and determine a respective torque limit which is provided to a torque modification function 626. In this embodiment, the torque modification function receives the first torque limit 604 from the alternator predictive subroutine 602, the second torque limit 610 from the alternator reactive subroutine 608, the third torque limit 616 from the engine predictive subroutine 614, and the fourth torque limit 622 from the engine reactive subroutine 620. The torque modification function 626 also receives the torque commanded by the operator via a fifth input node 628. During operation, the torque modification function 626 may command a torque value to the motors of the machine via an output node 630. The torque modification function 626 can advantageously appropriately limit or adjust the torque commanded by the operator at the fifth input node 628 based on the smallest or least of the torque limits provided via the first, second, third, and fourth limits 604, 610, 616, and 622, respectively.

The subroutines for the alternator predictive and reactive torque limits 604 and 610, as well as for the engine predictive and reactive torque limits 616 and 622, may be implemented in any appropriate arrangement. One embodiment for each of the subroutines 602, 608, 614, and 620 is discussed below. These specific embodiments are exemplary and should not be construed as limiting to the method employed to calculate each of the first, second, third, and fourth limits 604, 610, 616, and 622, respectively.

Figure 7:
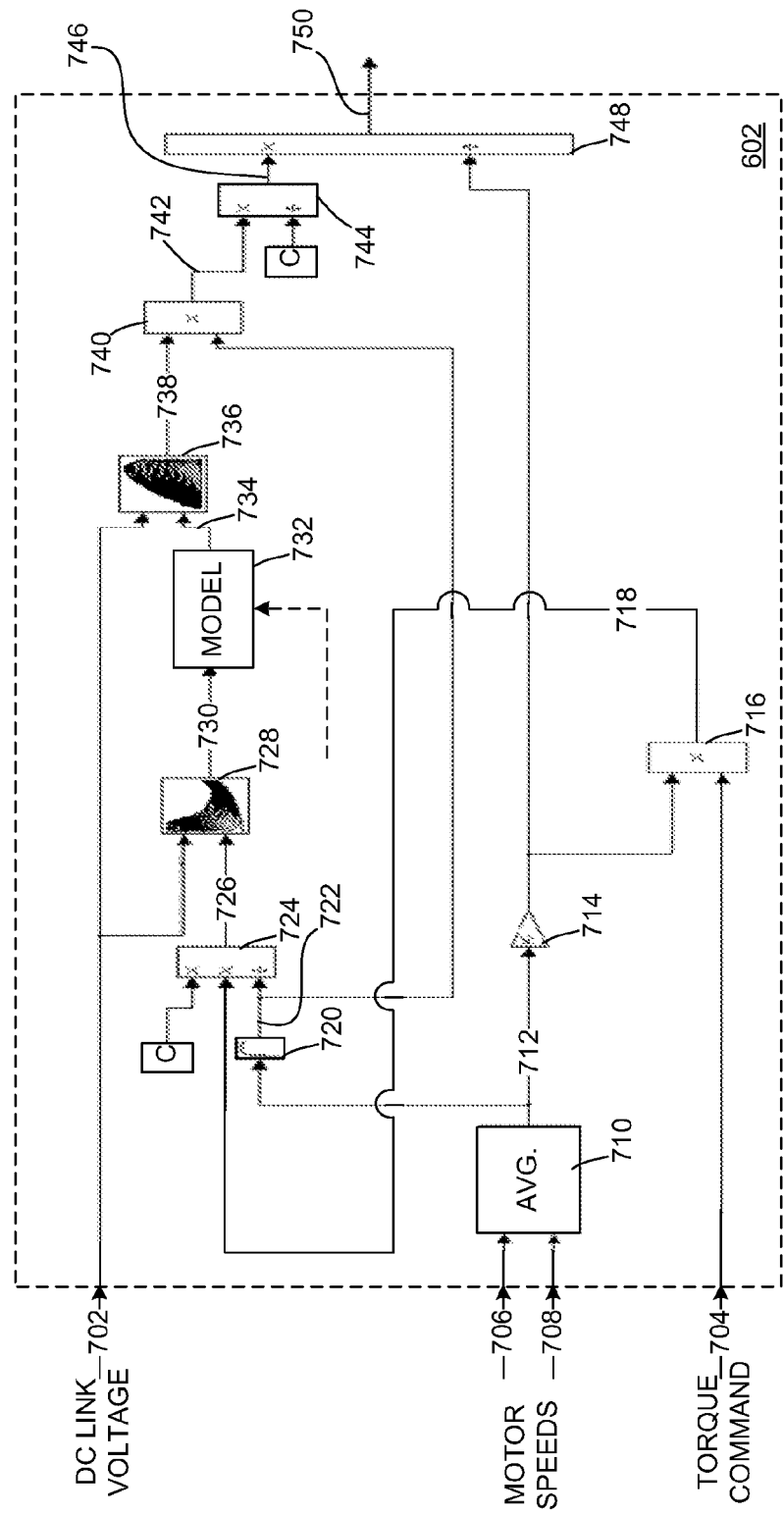
FIG. 7 is a block diagram representation of a computer-executable algorithm for an alternator predictive torque limiting subroutine in accordance with the disclosure.

Accordingly, a block diagram for one embodiment of the alternator predictive subroutine 602 is shown in FIG. 7. The alternator predictive subroutine 602 is arranged to modify a torque command to the motors such that an acceptable rate of alternator state change is ensured. For example, when the machine is operating under conditions that would require a fast response from the generator, such as grade changes, breakaway from a stall condition, a wheel slip condition, and other transient conditions, the torque limits calculated by the alternator predictive subroutine 602 can help balance any mismatch between the power supplied by the generator and the load applied or consumed by the motors. In short, any time lag in the ability of the generator to change its power output can be accounted for by adjusting the torque command to the motors such that the torque is gradually increased in a manner consistent with the generator's changing output.

In FIG. 7, the alternator predictive subroutine 602 receives the voltage in the DC link as an input in a first node 702. The torque command by the operator is received as an input to a second node 704, and the measured speeds for each of the drive motors are received at a third node 706 and a fourth node 708, respectively. The drive motor speeds are consistent with the number of drive motors controlled by the system, in this case two. The alternator predictive subroutine 602 uses a constant, C, when performing averaging or other normalization operations. In the embodiment presented, the constant C represents the number of drive motors in the system. Hence, in the description that follows, the constant C is equal to two, even though other embodiments may use a different constant in the case when fewer or more than two motors are included in the system.

The motor speeds at the third and fourth inputs nodes 706 and 708 are input to an average or normalization function 710. The normalization function 710 calculates an average motor speed 712 that represents an average or normalized instantaneous speed of the drive motors. Depending on the type of speed sensor used to measure the speed of the motors, a converter function 714 may convert the average motor speed 712, for example, from revolutions per minute (rpm) to radians per second (rad/sec.). The average motor speed 712 may be multiplied by the torque command at the second input node 704 at a multiplier 716 to yield a mechanical power 718 that is being commanded to each of the two motors based on the rate of rotation and commanded torque.

The motor speed 712 is also input to an efficiency function 720, which correlates the efficiency of each motor at any given speed. In this case, the efficiency function yields a value representative of the efficiency 722 of each motor at the average motor speed 712 in converting electrical power to mechanical power. The mechanical power 718 commanded to each motor, divided by the efficiency 722 for each motor, multiplied by the number of motors present in the system is performed in a calculation function 724 and yields a total mechanical power or power load 726 that is being requested by the operator.

The power load 726, along with the voltage in the DC link present at the first input node 702, are input into an excitation current predictor function 728. The excitation current predictor function 728 is capable of determining the excitation current that is required, at any given DC link voltage, to achieve a level of power output from the generator. Hence, the excitation current predictor function 728 can determine or predict the excitation current that will be required to achieve the power output of the system that is being commanded based on the current voltage present at the DC link.

Figure 8:
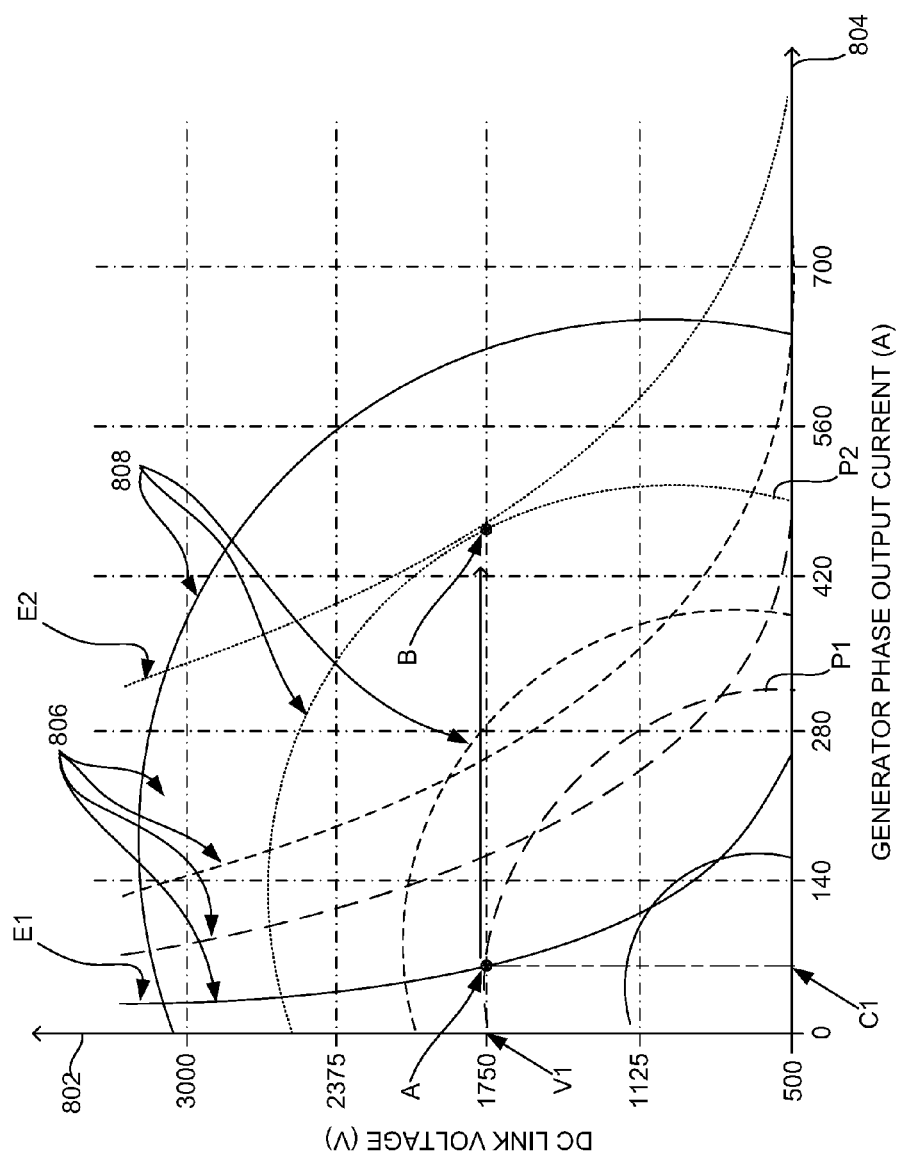
FIG. 8 is an exemplary graphical illustration for one embodiment of an excitation current predictor function in accordance with the disclosure.

One exemplary graphical illustration for one embodiment of an excitation current predictor function 728 is shown in FIG. 8. The excitation current predictor function 728 is represented by a two dimensional graph the illustrates the relationship between DC link voltage, which is plotted on the vertical axis 802, and the current output for each of the three phases of the generator, which is plotted against the horizontal axis 804 and which also represents the current passing through the DC link. The graph includes a plurality of excitation current curves 808, with each of the plurality of excitation current curves 808 representing a family of operating points of the generator having a range of outputs for the DC link voltages and corresponding currents at a particular excitation current. In other words, each of the plurality of excitation current curves 808 represents a constant excitation current line.

The graph shown in FIG. 8 further includes a plurality of power lines 806, with each of the plurality of power lines 806 representing a family of operating points of the generator that yield the same power output of the generator for different values of DC link voltage and current. In other words, each of the plurality of power lines 806 represents a constant power at the output of the generator that correlates to changing DC link voltage and changing DC link current. In general, the excitation current predictor function 728 includes a collection of data, such as the data shown in the graph of FIG. 8, for each value of the engine speed driving the generator. In the embodiment presented, for example, the graph shown in FIG. 8 may correspond to an engine speed or a generator rotor rate of rotation of about 1800 RPM.

During operation, a first point, A, on the graph may represent the operating state of the generator before application of the power load 726. Point A, therefore, may be situated on the graph along a first or currently applied excitation current curve, P1, at a DC link voltage, V1, which represents the voltage present at the DC link, a DC link current, C1, which represents the current present at the DC link, and a first power, E1, which lies on the corresponding one of the plurality of power lines 806 representing the power output of the generator. When the power load 726 is applied to the excitation current predictor function 728, a new point, B, can be defined by following a path of constant DC link voltage (denoted in the figure by an open headed arrow) from the first power E1 to a second power level, E2, which represents the power load 726.

Having established point B based on the power load 726, the excitation current predictor function 728 can yield a predicted or expected value for the excitation current that corresponds to the power load 726 that is requested by the operator. This prediction is made by use of the graph shown in FIG. 8, where the power load 726 is represented by point B, and point B graphically falls on, close to, or is interpolated to correspond to a new value, P2, of the excitation current. An electronic controller having the graph shown in FIG. 8 stored therein may easily perform appropriate mathematical operations or modeling calculations to determine the excitation current P2 that is required to yield the desired power from the generator, under the then current operating conditions of the machine.

Returning now to FIG. 7, a predicted excitation current 730 that is determined by the excitation current predictor function 728 is input to a model-based function 732. The model-based function 732 may be a computational representation or model-based algorithm that can approximate the transient performance of the generator as the excitation current changes. Stated differently, the model-based function 732 can be empirically determined based on known transient response data of the system, which can be transformed into an algorithm or function that models the performance of the system. The model-based function 732 may yield or predict an actual excitation current 734 that corresponds to the predicted excitation current 730. In most cases, the actual excitation current 734 as an output of the model-based function 732 may change over time, for example, increasing or decreasing, to track the expected gradual change in the operation of the generator as it passes through various intermediate states to reach a final state when undergoing a transient change in operation.

The actual excitation current 734 that is predicted based on the predicted transient response in power, is input to a power predictor function 736. The power predictor function 736 is capable of determining the power available to the system by the generator based on the actual excitation current 734 and the voltage in the DC link present at the first node 702, and provides an estimation of the actual power that will be produced by the power generation system. This estimated actual power is then substituted for the operator requested power if it is less than the operator requested power. The power predictor function 736 may include any appropriate data storage and manipulation device that can correlate the combination of a voltage value at the DC link and the actual excitation current 734 into an instantaneous power capability 738 of the generator. As the actual excitation current 734 changes, for example, increases, the power capability 738 of the generator will also increase.

In one embodiment, the power predictor function 736 includes tabulated data in a manner similar to the graph shown in FIG. 8. When the power predictor function 736 operates, the inputs of DC link voltage (plotted against the vertical axis) and excitation current (plotted as a plurality of curves in FIG. 8) can be used to interpolate or otherwise determine the current of the DC link (plotted against the horizontal axis in FIG. 8) and/or the power capability of the generator (plotted as a family of curves in FIG. 8).

The power capability 738 of the generator is multiplied by the output of the efficiency function 720 at a multiplier 740 to yield a more realistic assessment of the power available 742 to drive the motors. The power available 742 represents the power in the system that will be used to drive all motors of the machine, hence, the power available 742 is divided by the constant C (in this case, 2) at a divider 744 to yield the power available to drive each motor 746, before finally being divided by the motor speed 712 at an additional divider 748 to yield an alternator predictive limited torque command 750. The alternator predictive limited torque command 750 may be the first torque limit 604 (FIG. 6) at the output of the alternator predictive subroutine 602.

Figure 9:
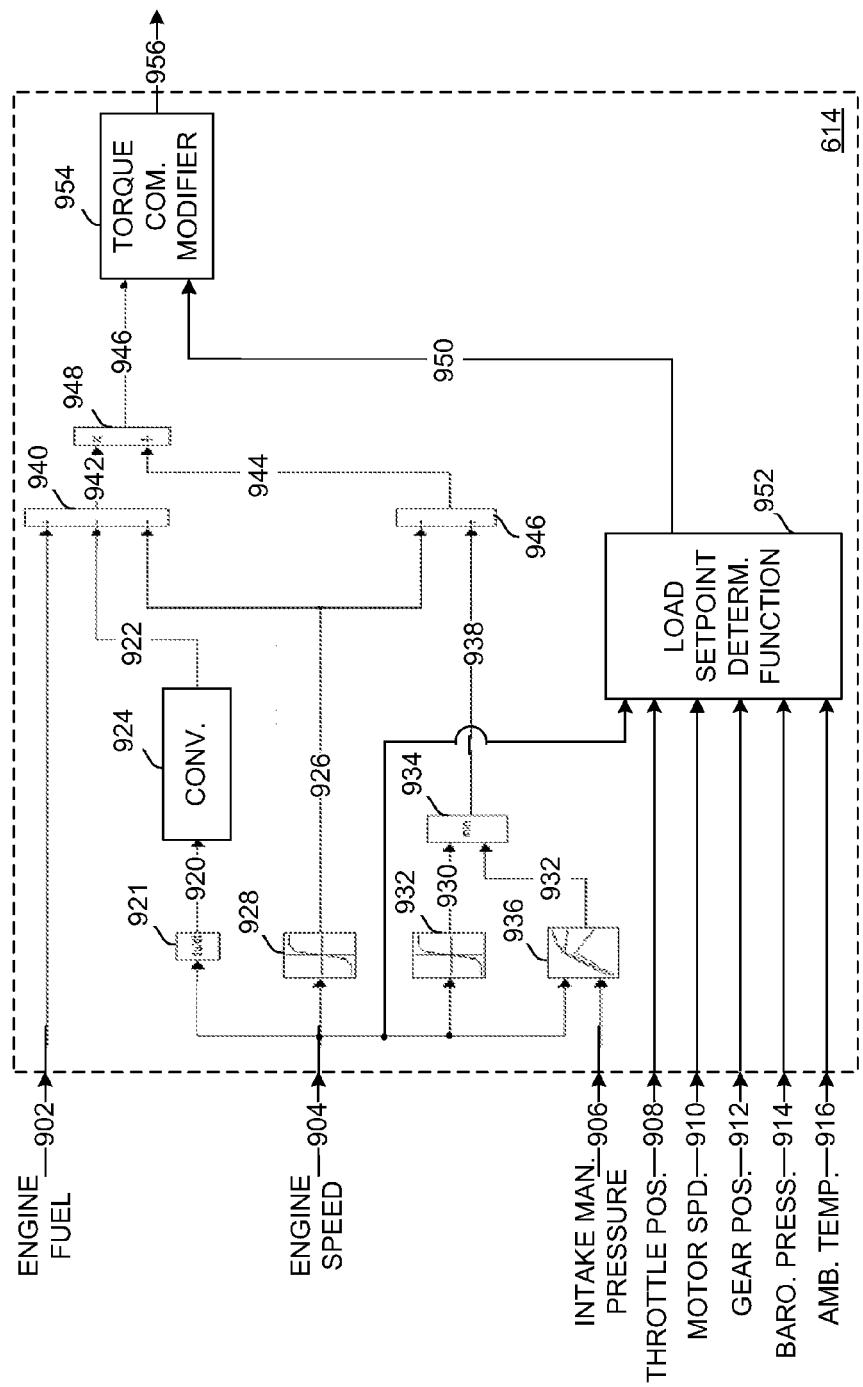
FIG. 9 is a block diagram representation of a computer-executable algorithm for an engine predictive subroutine in accordance with the disclosure.

A block diagram for one embodiment of the engine predictive subroutine 614 is shown in FIG. 9. The engine predictive subroutine 614 is arranged to modify a torque command to the motors such that the load on the motors is consistent with the ability of the engine to increase or decrease its power during transient changes in operation. For example, when the machine is operating under conditions that would require a fast response from the engine, such as hill starts and other transient conditions, the torque limits calculated by the engine predictive subroutine 614 can help balance any mismatch between the power supplied by the engine and the load applied or consumed by the motors. In short, the ramp-up time delay in the ability of the engine to increase its power output can be accounted for by adjusting the torque command to the motors such that the torque is increased in a manner consistent with the engine's ability to gradually increase its output.

The engine predictive subroutine 614 is arranged to have access to engine operating parameters. In one embodiment, the engine predictive subroutine 614 operates within a master controller of the machine that either directly controls or communicates with a separate controller that is tasked with operating the engine. In an alternate embodiment, the engine predictive subroutine 614 operates in a controller that operates the various components of the drive system and that is communicating with a controller operating the engine via a closed area network (CAN) link.

Regardless of the configuration of the various controllers on the machine, the engine predictive subroutine 614 receives an actual fuel signal at a first node 902, which is indicative of the fuel commanded to the engine. In this embodiment, the engine is a compression ignition or diesel engine, which means that the load and speed of the engine can be controlled by the amount of fuel that is injected into the engine's cylinders. In an alternate embodiment using a different type of engine, for example, a jet engine or a gasoline powered internal combustion engine, a different parameter may be used to indicate the operating state of the engine.

The engine predictive subroutine 614 receives an engine speed signal at a second node 904. The engine speed signal is indicative of the rotational speed of the engine's output and may be expressed in revolutions per minute. An intake manifold pressure signal is present at a third node 906. The intake manifold pressure signal is indicative of the air pressure within the intake manifold of the engine during operation. This parameter is typically considered when the engine has a turbocharger, supercharger, or any other device that operates to pump air into the intake manifold of the engine.

The engine predictive subroutine 614 further receives operating parameters that are relevant to the operation and the environment of the machine. In one embodiment, the engine predictive subroutine 614 receives a throttle position signal at a fourth node 908, which is indicative of the degree or acceleration or deceleration commanded by the operator of the machine, a motor speed signal at a fifth node 910, which is indicative of the rotating speed for the electric drive motors, and a gear position signal at a sixth node 912, which in the presence of a gear reducing device between the engine and generator or the electric drive motors and the wheels is indicative of the gear reduction therebetween.

The engine predictive subroutine 614 further receives parameters indicative of the operating environment of the machine, such as a barometric pressure signal at a seventh node 914, which is indicative of the altitude of operation of the machine, and an intake air temperature signal at an eighth node 916, which is indicative of the ambient temperature.

The engine predictive subroutine 614 is arranged to perform calculations and/or other operations using these and/or other parameters to determine a torque limit, which is present at a ninth node 918 and which operates to limit or adjust a torque command to the electric drive motors such that the torque command is consistent with the operating capabilities of the engine during transient operation. To accomplish this, the engine predictive subroutine 614 uses the engine speed signal from the second node 904 to calculate a derivative of the engine speed 920 in a derivative calculator 921. The derivative of the engine speed 920 is indicative of the acceleration or deceleration of the engine. The derivative of the engine speed may be converted to an acceleration fuel rate 922 in a converter function 924 that can be arranged to account for the moment of inertia of the engine and, in the case of a diesel engine, correlate engine speed to fuel command.

The engine predictive subroutine 614 also calculates a minimum allowable fuel 926 in, for example, a lookup table 928. The minimum allowable fuel 926 is indicative of the minimum fuel rate that will keep the engine operating. Stated differently, the minimum allowable fuel 926 represents the load required to overcome frictional and parasitic losses when the engine is operating in an idle or "no load" condition. A maximum allowable fuel 930 is calculated in a corresponding lookup table 932. The minimum allowable fuel 926 and the maximum allowable fuel 930 may reflect the physical limitations of the engine's fueling system based on engine speed, with the maximum allowable fuel 903 being indicative of the maximum fuel flow that can be provided by fuel system components for a specific engine speed, for example, the flow of fuel through a fuel pump or fuel injectors. The maximum allowable fuel 930 is compared to a smoke limit 932 at a comparator 934. The smoke limit 932 represents the limit to the amount of fuel that can be supplied to the engine for complete combustion, and is determined in a two-dimensional lookup table 936 that receives engine speed and the intake manifold pressure from the third node 906 as inputs. The output of the comparator 934 is a maximum fuel 938.

An unused power capacity of the engine, which here is expressed as an excess fuel capacity of the engine, is calculated by subtracting the acceleration fuel rate 922 and the minimum allowable fuel 926 from the actual fuel signal at the first node 902 in a calculator 940. The output or difference of the calculator 940 represents the fuel that is available in the engine at the current conditions of operation and at the current rate of acceleration, which is not used to provide power and correlates to the engine's available torque or unused power 942. The engine predictive subroutine 614 also calculates a total theoretical fuel or total theoretical power 944 by subtracting the minimum allowable fuel 926 from the maximum fuel 938 at a difference calculator 945. The total theoretical power represents the maximum or lug-line power of the engine at the operating condition.

An actual adjusted percent load signal (APLS) 946 can be calculated by dividing the unused power 942 with the total theoretical power 944 in a divider 948. The actual APLS 946 is indicative of a percentage of power that is actually available in the operation of the engine under the current operating conditions, which has been adjusted to account for a rate of acceleration of the engine. The engine predictive subroutine 614 also calculates a theoretical or desired APLS 950 in a load set point determination function 952. The load set point determination function 952 determines the desired APLS 950 based on the engine speed, which is provided via the second node 904, the throttle position signal at the fourth node 908, the motor speed at the fifth node 910, the gear position at the sixth node 912, the barometric pressure at the seventh node 914, the intake manifold pressure at the eighth node 916, and potentially other parameters of the machine. In one embodiment, the load setpoint determination function 952 is a model based algorithm that can predict the power requirements of the drive system based on the operator commands and the then current conditions of the system. The load setpoint determination function 952 is further capable of adjusting the desired APLS 950 such that the transient limitations of the system based on the operation of the engine are accounted for.

The actual APLS 946 and desired APLS 950 are input to a motor torque command modifier function 954. The motor torque command modifier function 954 yields a limit 956 representing the maximum torque that can be applied to the drive motors. This limit accounts for transient time lag in the entire engine system, which may result when the power requested by the engine increases. In one embodiment, the motor torque command modifier function 954 includes a control algorithm that incorporates feed forward and dynamic control terms, such as proportional, integral, and derivative control terms. Hence, the motor torque command modifier function 954 can continuously operate to adjust the torque of the motors such that the actual APLS 946 of the system continuously approaches the desired APLS 950 of the system, whether the machine is operating in a relatively steady mode of operation or in a transient mode. In one embodiment, the desired APLS 950 can be set at or close to 100% to help ensure smooth and fuel efficient operation of the machine and, more importantly, maximal ground speed capability of the machine.

Figure 10:
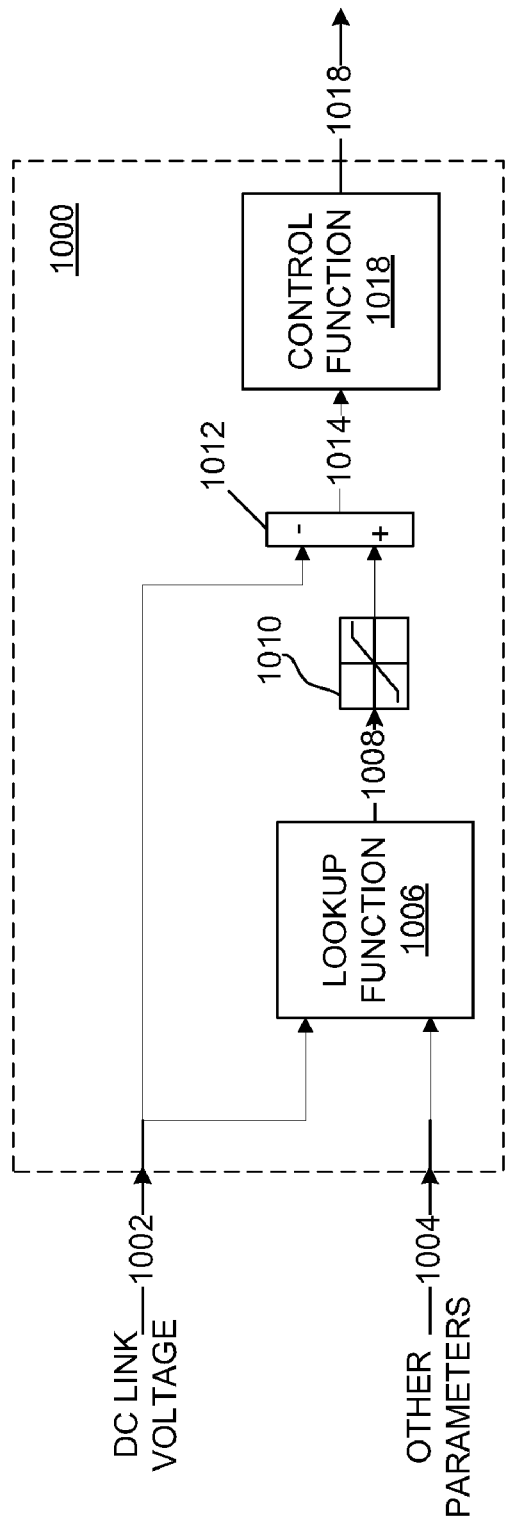
FIG. 10 is a block diagram representation of a computer-executable algorithm for a voltage control strategy in accordance with the disclosure.

The torque limiting routines described thus far limit the torque commanded to the electric drive motors or, alternatively, the load on the drive system to ensure proper operation of the machine. Additional limits to the load, expressed as a limit imposed to the torque commanded to the electric drive motors, can be based on the voltage across the DC link. In one embodiment, such a control determines a torque limit that is based on the difference between a desired voltage in the DC link and an actual or measured voltage in the DC link. A block diagram for a voltage control strategy 1000 is shown in FIG. 10.

The voltage control strategy 1000 receives a voltage signal 1002 that is indicative of the voltage in the DC link. Other parameters of the machine are input to the voltage control strategy 1000 via a second node 1004. The second node 1004 is shown as a single node but is capable of providing one or more signals to the voltage control strategy 1000 that are indicative of various states or operating signals of the machine. Such parameters provided at the second node 1004 include operator inputs, machine and/or electric drive motor speeds, engine speed, engine load, excitation current or voltage provided to the generator of the machine, activation states of the machine's retard arrangement, and others. The machine parameters provided at the second node 1004, along with the voltage signal 1002, are input to a lookup function 1006.

In one embodiment, the lookup function 1006 may include a one, two, or multidimensional array of data that is populated with desired values for the voltage in the DC link based on the various machine parameters or operating conditions. In an alternate embodiment, the lookup function 1006 may include a model based algorithm that can yield an optimum voltage level given a set of operating parameters. The lookup function 1006 can be arranged to accommodate the voltage requirements of the machine's drive system under most circumstances. A desired voltage value 1008 is provided at the output of the lookup function 1006. The desired voltage value 1008 can be optionally limited by a limiter 1010 that truncates the desired voltage value 1008, if necessary, to be between a lower voltage limit and an upper voltage limit. Depending on the application, the lower voltage limit can be a predetermined value representing the least acceptable voltage value of the voltage in the DC link that maintains proper operation of the system. In one embodiment the lower voltage limit may be zero volts. Similarly, the upper voltage limit represents any components limitations of the system in terms of the maximum voltage that the components can tolerate. In one embodiment, the upper voltage limit may be equal to 3200 Volts.

A difference between the desired voltage value 1008 and the voltage signal 1002 is calculated at a difference calculator 1012 to yield a voltage error signal 1014. The voltage error signal 1014 may be positive or negative and indicates the extent by which the voltage signal 1002 diverges from the desired voltage value 1008. The voltage error signal 1014 is provided to a control function 1016, which yields a voltage control torque limit 1018. The control function 1016 may be any type of appropriate control algorithm, which in one embodiment is implemented as a PI control. The voltage control torque limit 1018 may operate individually to ensure that the drive system does not cause the voltage in the DC link to diverge from a desired value.

In one embodiment, the voltage control torque limit 1018 operates in conjunction with the torque adjustment discussed relative to the electronic controller 600 (FIG. 6) insofar as the voltage control torque limit 1018 operates to prevent voltage spikes in the DC link during operation of the machine. The torque value commanded to the motors of the machine via the output node 630 (FIG. 6) of the electronic controller 600 accounts for, on the one hand, imbalances between the power produced by the drive system and the load on the drive system due to time lags or other factors that are relevant to the operation of the various components of the machine. The voltage control torque limit 1018, on the other hand, addresses voltage changes due to the operation of the machine, and operates to reduce or increase a torque command to ensure that a stable voltage is present in the DC link. For example, a hill start or sudden stop of the machine may cause the electronic controller 600 (FIG. 6) to intervene and adjust the torque commands to the motors that ensures a balance between the power produced by the engine and/or generator and the power or load consumed by the motors.

While the machine is moving, however, a sudden change in motion, such as a bump or other such condition, may instantaneously change the load on the drive system, which may result in a temporary voltage change. Such a change should be avoided for the smooth operation of the drive system. Hence, the voltage control torque limit 1018 may operate to smooth such a spike in the voltage of the DC link that is caused by a temporary influence. In one embodiment, therefore, the voltage control torque limit 1018 can supersede any torque command or limit generated by another control algorithm and can be applied directly to the inverter circuit 208 (FIG. 4) of the machine.

INDUSTRIAL APPLICABILITY

The industrial applicability of the methods and systems for power management as described herein should be readily appreciated from the foregoing discussion. The present disclosure is applicable to many machines and many environments. One exemplary machine suited to the disclosure is an off-highway truck. Exemplary off-highway trucks are commonly used in mines, construction sites, and quarries. Entities that use these off-highway trucks often sustain significant monetary losses from an off-highway truck that is not operating at peak efficiency.

Off-highway trucks, particularly those adapted to use electric, hybrid, or direct series electric drive systems, are subject to sudden load changes, and it can often be difficult to accommodate such load changes. Thus, a method and system that can improve the speed and accuracy with which a machine responds to changing power demands can significantly increase operating efficiencies.

Further, the methods and systems described above can be adapted to a large variety of machines and tasks. For example, other types of industrial machines, such as backhoe loaders, compactors, feller bunchers, forest machines, industrial loaders, skid steer loaders, wheel loaders and many other machines can benefit from the methods and systems described.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A method of load demand and power generation balancing within an electric drive system comprising one or more electric drive motors supplying torque used to propel a machine, the electric drive system including a fuel-driven prime mover for driving an electrical power generator including a field circuit through which a controlled excitation current flows, the electrical power generator providing electrical power for a DC link having a voltage characteristic and a current characteristic, the method comprising:
   determining a voltage value of the DC link;
   determining a torque command by an operator of the electric drive system;
   determining a speed for each of the one or more electric drive motors receiving power provided from the DC link at the voltage value;
   normalizing the determined speed to derive an average motor speed;
   deriving a mechanical power that is being commanded based on the average motor speed and the torque command;
   determining, using an excitation current predictor function, a predicted excitation current value, for the controlled excitation current flowing through the field circuit of the electrical power generator, based on the derived mechanical power and the voltage value of the DC link, wherein the excitation current predictor function references excitation current data providing, for each of a plurality of constant excitation current levels for the field circuit, a current output produced by the electrical generator at the voltage value of the DC link; and
   applying an actual excitation current to the field circuit of the electrical power generator, the actual excitation current being based on the predicted excitation current.

2. The method of load demand and power generation balancing according to claim 1, further comprising determining the actual excitation current using a model based function, and wherein determining the actual excitation current further comprises approximating, using the model based function, a transient performance of the electrical power generator as the excitation current changes to reach a state corresponding to the predicted excitation current.

3. The method of load demand and power generation balancing according to claim 2, wherein approximating the transient performance of the electrical power generator as the excitation current changes includes applying a computational representation of the electrical power generator.

4. The method of load demand and power generation balancing according to claim 2, wherein approximating the transient performance of the electrical power generator as the excitation current changes includes modeling the electrical power generator.

5. The method of load demand and power generation balancing according to claim 2, wherein deriving the mechanical power that is being commanded based on the average motor speed and the torque command includes applying an efficiency function.

6. The method of load demand and power generation balancing according to claim 5, wherein the efficiency function determines an efficiency of each motor at the average motor speed to convert electrical power to mechanical power.

7. The method of load demand and power generation balancing according to claim 1, further including using a power predictor function to determine a power available to the electric drive system based on the actual excitation current and the voltage value of the DC link.

8. The method of claim 1, wherein the excitation current data comprises a plurality of excitation current curves, and
   wherein each excitation current curve, for a particular constant excitation current level, relates a range of voltage values of the DC link and a range of current output produced by the electrical generator over the range of voltage values.

9. The method of claim 1, wherein the excitation current data is provided for a constant generator rotor rate of rotation.

10. The method of claim 1, wherein the predicted excitation current value is determined, by the excitation current predictor function, based upon a constraint of maintaining the voltage of the DC link at the voltage value of the DC link while changing the current output produced by the electrical generator in response to the torque command.

11. A controller for balancing a load demand and power generation within an electric drive system comprising one or more electric drive motors supplying torque used to propel a machine, the electric drive system including a fuel-driven prime mover for driving an electrical power generator including a field circuit through which a controlled excitation current flows, the electrical power generator providing electrical power for a DC link having a voltage characteristic and a current characteristic, the controller including computer-executable instructions on a computer-readable medium, the computer-executable instructions comprising instructions for:
   determining a voltage value of the DC link;
   determining a torque command by an operator of the electric drive system;
   determining a speed for each of the one or more electric drive motors receiving power provided from the DC link at the voltage value;
   normalizing the determined speed to derive an average motor speed;

deriving a mechanical power that is being commanded based on the average motor speed and the torque command;

determining, using an excitation current predictor function, a predicted excitation current value, for the controlled excitation current flowing through the field circuit of the electrical power generator, based on the derived mechanical power and the voltage value of the DC link, wherein the excitation current predictor function references excitation current data providing, for each of a plurality of constant excitation current levels for the field circuit, a current output produced by the electrical generator at the voltage value of the DC link; and applying an actual excitation current to the field circuit of the electrical power generator, the actual excitation current being based on the predicted excitation current.

12. The controller for balancing the load demand and power generation according to claim 11, further comprising instructions for determining the actual excitation current using a model based function, and wherein the instructions for determining the actual excitation current further comprise instructions for approximating, using the model based function, a transient performance of the electrical power generator as the excitation current changes to reach a state corresponding to the predicted excitation current.

13. The controller for balancing the load demand and power generation according to claim 12, wherein the instructions for approximating the transient performance of the electrical power generator as the excitation current changes include instructions for applying a computational representation of the electrical power generator.

14. The controller for balancing the load demand and power generation according to claim 12, wherein the instructions for approximating the transient performance of the electrical power generator as the excitation current changes include instructions for modeling the electrical power generator.

15. The controller for balancing the load demand and power generation according to claim 12, wherein the instructions for deriving the mechanical power that is being commanded based on the average motor speed and the torque command include instructions for applying an efficiency function.

16. The controller for balancing the load demand and power generation according to claim 15, wherein the efficiency function determines an efficiency of each motor at the average motor speed to convert electrical power to mechanical power.

17. The controller for balancing the load demand and power generation according to claim 11, wherein the computer-executable instructions further include instructions for using a power predictor function to determine a power available to the electric drive system based on the actual excitation current and the voltage value of the DC link.

18. A computer-readable medium having thereon computer-executable instructions for balancing a load demand and power generation within an electric drive system comprising one or more electric drive motors supplying torque used to propel a machine, the electric drive system including a fuel-driven prime mover for driving an electrical power generator including a field circuit through which a controlled excitation current flows, the electrical power generator providing electrical power for a DC link having a voltage characteristic and current a characteristic, a controller including the computer-executable instructions on the computer-readable medium, the computer-executable instructions comprising instructions for:

determining a voltage value of the DC link;

determining a torque command by an operator of the electric drive system;

determining a speed for each of the one or more electric drive motors receiving power provided from the DC link at the voltage value;

normalizing the determined speed to derive an average motor speed;

deriving a mechanical power that is being commanded based on the average motor speed and the torque command;

determining, using an excitation current predictor function, a predicted excitation current value, for the controlled excitation current flowing through the field circuit of the electrical power generator, based on the derived mechanical power and the voltage value of the DC link, wherein the excitation current predictor function references excitation current data providing, for each of a plurality of constant excitation current levels for the field circuit, a current output produced by the electrical generator at the voltage value of the DC link; and applying an actual excitation current to the field circuit of the electrical power generator, the actual excitation current being based on the predicted excitation current.

19. The computer-readable medium according to claim 18, further comprising instructions for determining the actual excitation current using a model based function, and wherein the instructions for determining the actual excitation current that is required to achieve the derived mechanical power further comprise instructions for approximating, using the model based function, a transient performance of the electrical power generator as the excitation current changes to reach a state corresponding to the predicted excitation current, by applying a computational representation of the electrical power generator.

20. The computer-readable medium according to claim 18, wherein the instructions for deriving the mechanical power that is being commanded based on the average motor speed and the torque command include instructions for applying an efficiency function.

* * * * *